Figure 6:
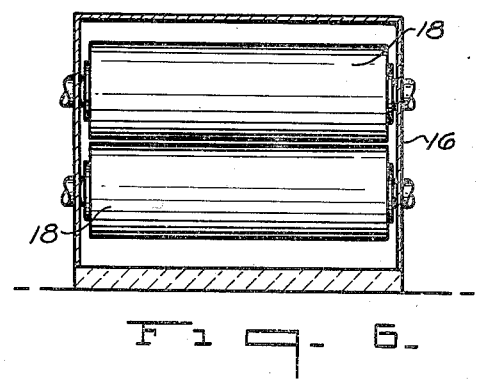

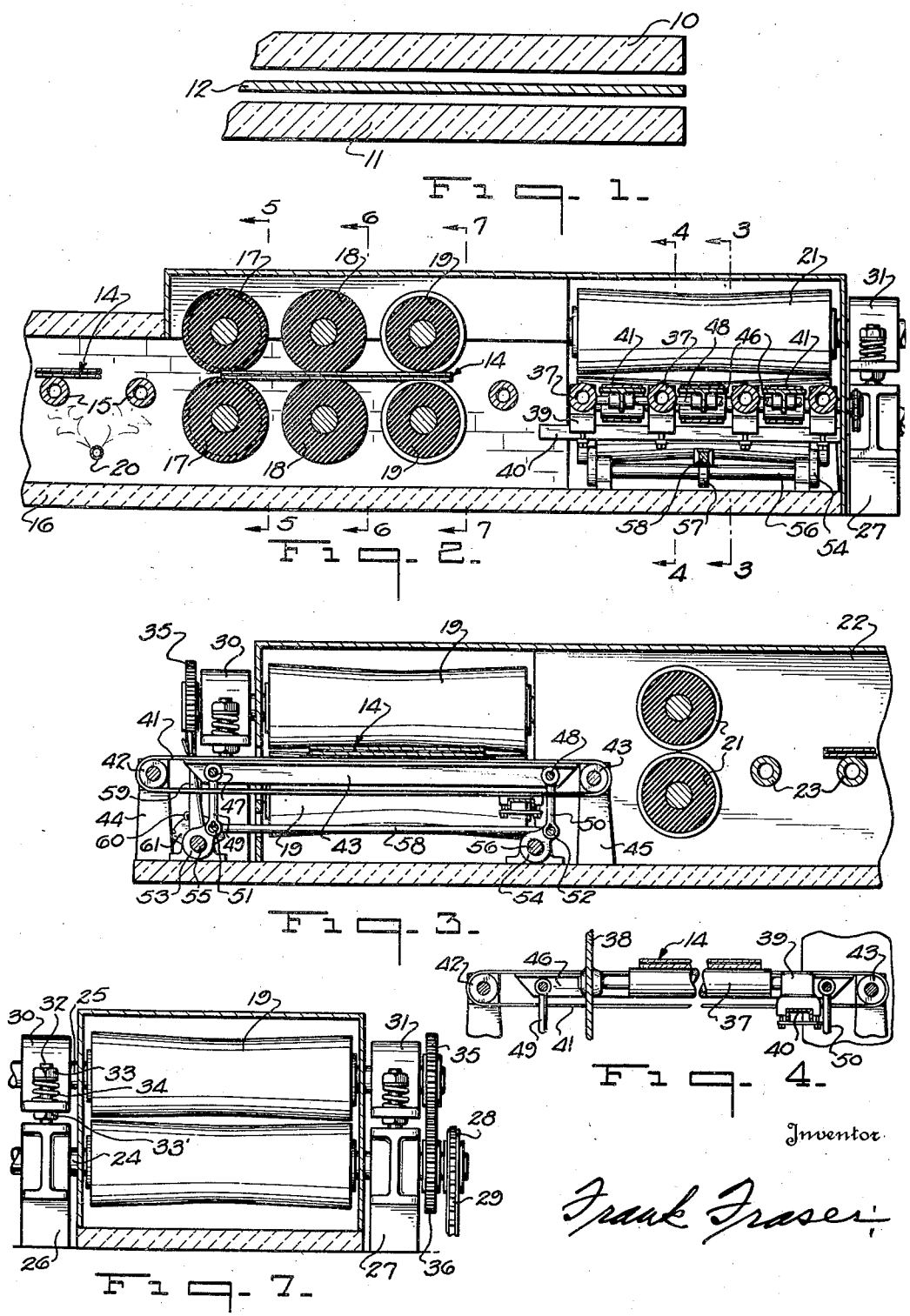

May 29, 1934. F. FRASER 1,960,580
PROCESS AND APPARATUS FOR PRODUCING LAMINATED GLASS
Filed Aug. 20, 1930 2 Sheets-Sheet 2

Inventor
Frank Fraser

Patented May 29, 1934

1,960,580

UNITED STATES PATENT OFFICE 1,960,580

PROCESS AND APPARATUS FOR PRODUCING LAMINATED GLASS

Frank Fraser, Toledo, Ohio, assignor to Libbey-Owens-Ford Glass Company, Toledo, Ohio, a corporation of Ohio Application August 20, 1930, Serial No. 476,546

11 Claims. (Cl. 49—81)

The present invention relates to an improved process and apparatus for producing laminated glass.

The expression "laminated glass" is employed to designate a composite structure consisting usually of two or more sheets of glass and one or more interposed non-brittle membranes. It is quite customary in the commercial production of laminated glass to use a pyroxylin plastic for the non-brittle membrane. However, the present invention is not limited to any particular ingredient or ingredients used as the non-brittle portion of the laminated sheet nor to the adhesive or other bonding agent employed to obtain the bond between the various laminations.

According to this invention, the glass sheets and non-brittle membrane or membranes are first treated in the desired manner with a bonding or bond inducing medium and then assembled in proper superimposed relationship to form a "sandwich". The said sandwich is then submerged unprotected within a bath of fluid contained in an autoclave and there subjected to the combined action of heat and pressure, the said fluid coming into direct contact with the sandwich so as to effect a uniform application of heat and pressure throughout from all sides thereof whereby to cause a bonding together of the several laminations to produce a composite structure. However, it has been found desirable that the sandwich, before being placed within the fluid bath, be subjected at least to a relatively light initial or preliminary pressing sufficient to expell any air, excess bonding medium, if any, non-condensable gases, etc. from between the several laminations and to cause said laminations to stick together to prevent the pressing fluid from creeping in between the laminations when said sandwich is placed within the autoclave.

The aim and principal object of the present invention, therefore, lies in the provision of a novel process and apparatus for treating the sandwich in a manner to effect the desired initial or preliminary pressing thereof prior to its being placed within the autoclave wherein it is subjected to finishing temperatures and pressures.

Another object of the nvention is the provision of a process and apparatus wherein the laminations, after being treated in the desired manner and arranged in properly assembled relationship to produce a sandwich, are subjected to a preliminary or initial pressing in a manner to cause said laminations to adhere to one another throughout substantially their entire areas, after which the edge portions only of the sandwich are subjected to an additional pressure to "seal" the edges thereof whereby to more effectively prevent the entrance of fluid between the laminations when the sandwich is placed in the autoclave.

A further object of the invention is the provision of such a process and apparatus wherein the initial or preliminary pressing of the sandwich may be rapidly and conveniently effected in a substantially continuous manner by passing the sandwich between a plurality of pairs of rolls or other pressing instrumentalities to bring the adjacent surfaces of the laminations into fairly intimate contact and to also "seal" the edges thereof.

Still another object is to provide such a process and apparatus wherein the initial or preliminary pressing of the sandwich is effected by the use of a plurality of pairs of rolls or other pressing instrumentalities of such character that upon passage of the sandwich therebetween, the said rolls or the like will function to initially exert the greatest pressure upon the sandwich centrally thereof to expell all air, etc. from between the laminations, said sandwich being then pressed to give a more or less intimate contact between the adjacent laminations throughout substantially their entire areas, after which the edge portions only of the sandwich are subjected to an additional pressure to "seal" the same.

Other objects and advantages of the invention will become more apparent during the course of the following description when taken in connection with the accompanying drawings.

Figure 5:
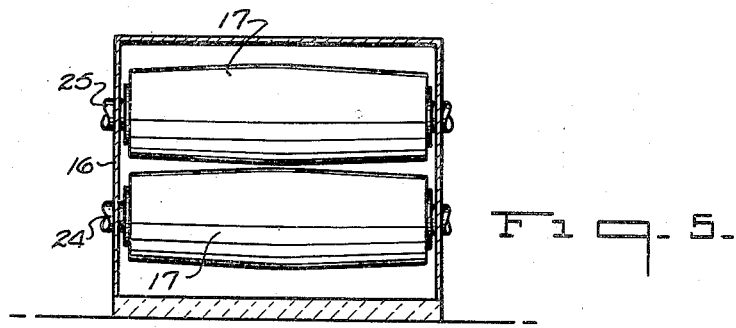
Figure 8:
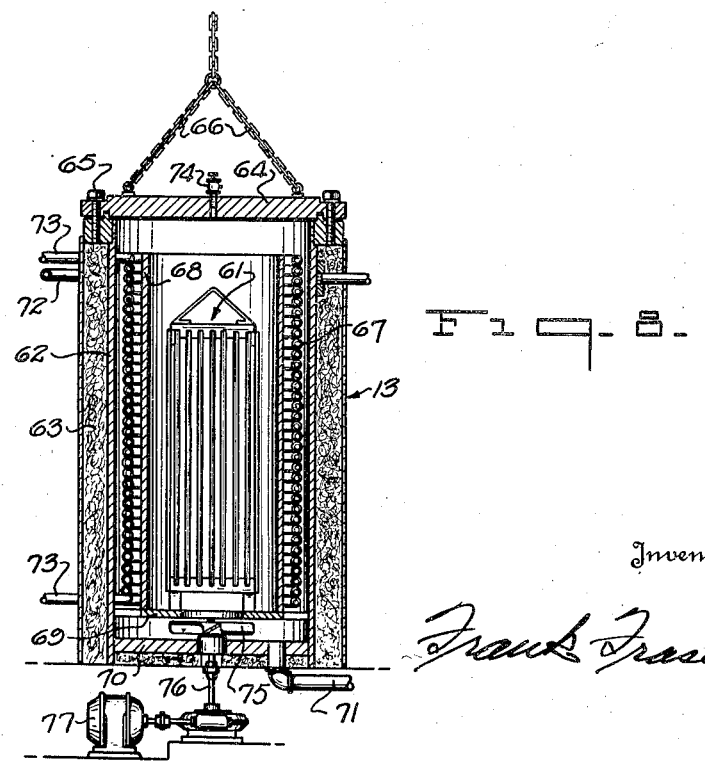

In the drawings wherein like numerals are employed to designate like parts throughout the same, Fig. 1 is a fragmentary sectional view illustrating diagrammatically the several laminations arranged in proper superimposed relationship but being spaced from one another, Fig. 2 is a vertical longitudinal section through apparatus provided by the present invention for exerting the initial or preliminary pressing of the sandwich, Fig. 3 is a section taken substantially on line 3—3 of Fig. 2, Fig. 4 is a section taken substantially on line 4—4 of Fig. 2, Figs. 5, 6, and 7 are transverse sectional views taken substantially on lines 5—5, 6—6, and 7—7 respectively of Fig. 2, the supporting and driving means for the rolls being removed from Figs. 5 and 6, and Fig. 8 is a vertical transverse section through the autoclave.

In Fig. 1 of the drawings, 10 and 11 designate two sheets of glass between which is interposed a non-brittle membrane 12. In some processes, the glass sheets are provided with skin coats of gelatin or nitro-cellulose compounds while in others no such skin coats are employed, but a suitable bond inducing medium or the like is applied directly to the non-brittle membrane. However, there are also other processes, and it is therefore to be understood that the present invention is in no way limited to any particular process or ingredients used in the manufacture of the composite sheet. On the other hand, this invention relates particularly to the treatment of the sandwich after the laminations have been treated in the desired manner with a bonding or bond inducing medium and arranged in proper assembled relationship.

According to the present invention, after the several laminations have been properly assembled with respect to one another to form a sandwich, the said sandwich is adapted to be submerged unprotected within a bath of fluid under pressure and which may be contained within an autoclave of the type illustrated in Fig. 8 and designated in its entirety by the numeral 13. Within this autoclave, the sandwich is subjected to the desired temperatures and pressures to form a composite sheet as will be more fully hereinafter described. However, since the sandwich is to be placed unprotected within the fluid bath, it has been found desirable, in order to obtain the best results, that the surfaces of the adjacent laminations be in more or less intimate contact with one another before being placed in the autoclave. Thus, if the laminations were not in intimate contact before their introduction into the autoclave and without the use of protecting means for the sandwich, it would be impossible to get the intimate contact between the surfaces in the autoclave, and furthermore the pressing fluid would creep in between the laminations, making it impossible to properly join them. It has accordingly been proposed that the sandwich, prior to being placed within the autoclave, be subjected to a preliminary or initial pressing to bring the laminations into more or less intimate contact with one another so that the desired pressure upon the sandwich within the autoclave may be obtained, and fluid prevented from creeping in between the laminations. It will, of course, be understood that the expression "intimate contact" is relative and does not necessarily infer absolute contact.

In accordance with this invention, the preliminary or initial pressing of the sandwich is adapted to be effected in a substantially continuous manner by passing the sandwich between a plurality of pairs of rolls or other pressing instrumentalities whereby the laminations are first subjected to the greatest pressure centrally of the sheet to expel all air, etc., from therebetween, the laminations being then subjected to pressure in a manner to cause them to be stuck together throughout substantially their entire areas, after which the edge portions only of the sandwich are subjected to an additional pressure to cause a "sealing" of said edge portions.

To effect the desired preliminary pressing above described, the laminations are first assembled to form a sandwich and the said sandwich 14 then placed upon a plurality of horizontally aligned conveyor rolls 15 and carried thereby through a temperature controlled tunnel 16 toward the pressing rolls 17, 18 and 19 which are also arranged within said tunnel. The temperature within the tunnel may be controlled by burners or the like, 20, and the heat within the tunnel will cause a slight softening of the non-brittle material to facilitate the sticking together of the laminations. The pressing rolls are arranged in pairs as shown and are preferably formed of rubber or some other soft resilient material. The rolls 17 with which the sandwich initially contacts are best shown in Fig. 5, and upon reference thereto, it will be seen that the diameter of these rolls is greatest at the longitudinal centers thereof and that said rolls taper toward their opposite ends. With such a type of roll, it will be readily apparent that as the sandwich is passed therebetween, the said rolls will tend to exert the greatest pressure centrally of the laminated sheet so as to force from between the laminations, any air, excess bonding medium, if any, non-condensable gases, etc. which be therebetween.

The next pair of rolls 18 are best shown in Fig. 6 and it will be seen that these rolls are substantially true cylinders so that as the sandwich is passed therebetween, said rolls will function to press and cause a sticking together of the laminations throughout substantially their entire areas. The final pair of rolls 19 are best shown in Fig. 7, and it will be seen that the form of these rolls is exactly opposite to that of rolls 17. In other words, while rolls 17 may be termed convex rolls, rolls 19 are concave rolls, or otherwise stated, the diameter of the rolls is smallest at their longitudinal centers and gradually become enlarged toward their opposite ends. With this type of roll, it will be seen that as the sandwich is passed therebetween, the said rolls will exert an additional pressure upon the opposite edge portions only of the sandwich in order to effect the desired "sealing" of said edge portions, so as to more effectively prevent the entrance of air between the laminations when the sandwich is placed in the autoclave.

After the sheet has been passed between the rolls 19, it can then be passed at right angles to its former direction of travel between a second pair of concave rolls 21 similar to rolls 19 which will effect "sealing" of the other two edge portions of the sandwich, after which the sandwich is ready to be placed within the autoclave. The rolls 21 are located within one end of a tunnel 22 and the said sandwich, upon leaving rolls 21, may be supported and carried forwardly through said tunnel upon a plurality of conveyor rolls 23. The temperature of tunnel 22 may be also controlled as desired.

The pairs of rolls 17, 18, 19 and 21 may all be mounted and driven in the same manner. Thus, by referring to Fig. 7, it will be seen that each pair of rolls may be carried on shafts 24 and 25, the shaft 24 for the lower roll projecting through the side walls of the respective tunnel and being supported at opposite ends in stationary standards 26 and 27, said shaft carrying at one end a sprocket 28 driven by a sprocket chain 29. The shaft 25 for the upper roll is supported at its opposite ends in the movable journals 30 and 31 held in place by means of bolts 32 carried by standards 26 and 27. A nut 33 is carried by each bolt 32, while a resilient member, such as a spring 34, is interposed between the nut and a portion of the respective journal. The strength of the springs 34 is such as to normally urge the upper roll toward the lower roll and the limit of downward movement of said upper roll is controlled by the position of nuts 33' on the bolts 32. The tension of the springs is controlled by the adjustment of the nuts 33. Intermeshing gears 35 and 36 may be carried by the shafts 24 and 25 at one or both ends thereof so that upon positive rotation of the sprocket 28, the rolls will be rotated in unison in opposite directions. Obviously, the length of the teeth of the gears 35 and 36 is such that the rolls can be moved within desired limits without causing a disengagement of said gears.

The means for changing the direction of travel of the sandwich so that after it leaves the rolls 19, it may be passed at substantially right angles between the rolls 21, is best illustrated in Figs. 2, 3 and 4. Such means comprises a plurality of spaced parallel rolls 37 positioned substantially parallel and in alignment with rolls 19 for receiving the sandwich therefrom, each roll 37 being journaled at one end in the side wall 38 of tunnel 16 and at its opposite end within a bracket 39 secured to a supporting channel beam 40, said channel beam being common to the brackets 39 for all of the rolls 37. Interposed between adjacent rolls 37 and extending parallel therewith is a plurality of endless belts 41, each being trained about drums 42 and 43 carried by brackets 44 and 45 respectively. Located beneath the upper horizontal flight or run of each belt 41 is a horizontal supporting table or the like 46. The tables 46 for the several belts are connected together at their opposite ends by the transverse shafts 47 and 48. Pivoted to and depending from these shafts at opposite ends thereof are the links 49 and 50 also pivoted at their lower ends by means of pins 51 and 52 to the cam members 53 and 54 mounted upon transverse shafts 55 and 56. A cam member 57, similar to cam members 53 and 54, is carried by each of shafts 55 and 56 intermediate their ends and these cam members are connected by a rod 58. Fixed to shaft 55 is an operating handle 59 carrying a spring pressed pawl 61 adapted for selective engagement within notches in the segment 61. Thus, it will be seen that upon swinging of the operating lever 59 to the left or right in Fig. 3, the tables 46 can be either raised or lowered so as to raise or lower the upper flights of the belts 41 above or beneath the level of the rolls 37. During the passing of the sandwich between rolls 17, 18 and 19, the tables 46 are in lowered position as illustrated in Fig. 2 so that the sheet can be carried forwardly over and supported upon rolls 37. However, when the sandwich is upon rolls 37, the operating lever 59 is swung to the left in a manner to cause a raising of the tables 46 which will in turn cause the upper flights of the belts to be raised above the level of the rolls 37. This will naturally transfer the sandwich from the rolls to the belts which will carry the same in a direction at substantially right angles with respect to its first direction of travel to pass the sandwich between the rolls 21.

After the preliminary pressing of the sandwich 14 has been completed, the sandwich may be arranged within a rack 61 which may then be placed within the autoclave 13 as shown in Fig. 8. It is considered desirable to arrange the sandwiches within the rack in spaced relation with respect to one another so that the pressing fluid can circulate between adjacent sandwiches. The specific construction of the autoclave per se is of no particular importance as regards this application so that a general description thereof only will be given. The autoclave 13 consists of a vertically elongated, preferably cylindrical tank 62 which may be surrounded by a covering of insulation 63. A removable top 64, provided with a suitable sealing means, may be used and when in place is held in position by bolts or other fastening means 65, said top being placed upon and removed from the autoclave by means of chains or the like 66.

Positioned within the tank 62 is a pipe coil 67 preferably mounted in spaced relation to the walls of said tank and extending vertically therein. Inwardly of the coils is a vertical partition member 68 which preferably terminates short of the top and bottom walls of the tank. Adapted to be placed within the compartment formed by the partition wall 68 is the removable rack 61 designed to carry the laminated glass sandwiches. The rack 61 is preferably supported upon the horizontal member 69 positioned in spaced relation to the bottom 70 of the autoclave tank.

It is preferred that a fluid be used in the autoclave as the pressing medium and to this end, conduits 71 and 72 are provided to permit the introduction and removal of the fluid into and from the autoclave. The coils 67 are likewise provided with conduits 73 having connection with a suitable source of supply for the temperature control medium. Valve 74 is carried by the top 64 of the autoclave to allow the escape of air from within the autoclave during the circulation of the fluid therethrough. Likewise, it is considered desirable to include an agitating device 75 within the autoclave to get the desired circulation with consequent uniformity of temperature of the fluid during the pressing operation, said agitating device being carried on a shaft 76 geared to and driven from a motor 77.

After the rack 61, carrying the glass, has been placed within the autoclave, the top 64 is secured in position, the valve 74 opened, and the fluid introduced into the autoclave. In some instances, some fluid may be present in the autoclave at the time the rack is placed therein and if such is the case, additional fluid is passed into the autoclave and as it fills up, any air therein will pass out through the valve. When fluid commences to flow through the valve, the valve may be closed and pressure built up in the autoclave by means of a pump or other mechanism. With the particular type of autoclave illustrated, the heat exchanger system is positioned internally thereof and a cycle of operation that may be employed is as follows:

Immerse the glass in the liquid when it is at a temperature of approximately 190° Fahrenheit. Then after the autoclave is closed, circulate steam through the coils 67 and operate the agitator until a temperature of approximately 240° F. is reached. It is then preferred that the glass be held at this temperature and at a pressure of approximately 200 lbs. per square inch for about eight minutes. Cooling fluid may then be circulated through the heat exchanger to lower the temperature to approximately 190° F. and of course the pressure is cut down and the glass is then in condition to be removed from the autoclave and washed.

I claim:

1. The process of producing laminated sheet glass, which consists in assembling a plurality of laminations to form a sandwich, subjecting said sandwich to a preliminary pressing in a manner to cause the laminations to adhere to one another throughout substantially their entire areas, in then subjecting the edge portions only of the sandwich to an additional rolling pressure to "seal" the edges thereof, and in then subjecting the sandwich to the action of fluid under pressure to produce a composite sheet.

2. The process of producing laminated sheet glass, which consists in assembling a plurality of laminations to form a sandwich, subjecting said sandwich to a preliminary pressing by rolling pressure in a manner to cause the laminations to adhere to one another throughout substantially their entire areas, in then subjecting the edge portions only of the sandwich to an additional rolling pressure to "seal" the edges thereof, and in then submerging the sandwich unprotected in fluid under pressure and subjecting it to the direct action thereof to produce a composite sheet.

3. The process of producing laminated sheet glass, which consists in assembling a plurality of laminations to form a sandwich, passing said sandwich in a generally horizontal direction, subjecting said sandwich to a preliminary pressing during movement thereof in a manner to cause the laminations to adhere to one another throughout substantially their entire areas, in then subjecting the edge portions only of the sandwich during movement of said sandwich to an additional rolling pressure to "seal" the edges thereof, and in then subjecting the sandwich to the action of fluid under pressure to produce a composite sheet.

4. The process of producing laminated sheet glass, which consists in assembling a plurality of laminations to form a sandwich, passing said sandwich in a generally horizontal direction, subjecting said sandwich to a preliminary pressing during movement thereof by exerting thereupon a rolling pressure in a manner to cause the laminations to adhere to one another throughout substantially their entire areas, in then subjecting the edge portions only of the sandwich during movement of said sandwich to an additional rolling pressure to "seal" the edges thereof, and in then submerging the sandwich unprotected in fluid under pressure and subjecting it to the direct action thereof to produce a composite sheet.

5. The process of producing laminated sheet glass, which consists in assembling a plurality of laminations to form a sandwich, passing said sandwich in a generally horizontal direction, subjecting the sandwich during movement thereof to a preliminary pressing by exerting a rolling pressure thereupon first at substantially the center thereof, then over substantially its entire area and finally at the edge portions only, and in then subjecting the sandwich to the action of fluid under pressure to produce a composite sheet.

6. The process of producing laminated sheet glass, which consists in assembling a plurality of laminations to form a sandwich, passing said sandwich in a generally horizontal direction between a plurality of pairs of pressing rolls, in causing said rolls to effect a preliminary pressing of the sandwich during its passage therebetween by exerting an initial pressure upon the sandwich at substantially the center thereof, then throughout substantially its entire area and finally along its border portions only, and in then subjecting the sandwich to the action of fluid under pressure to produce a composite sheet.

7. In apparatus for use in the production of laminated sheet glass including two sheets of glass and an interposed sheet of non-brittle material assembled to form a sandwich, means for effecting a preliminary pressing of the sandwich embodying a plurality of pairs of rotatable rolls between which the sandwich is adapted to be passed, said rotatable rolls being of such character that they will function to exert a pressure upon the sandwich first at substantially the center thereof, then over substantially its entire area, and finally at the edge portions only.

8. In apparatus for use in the production of laminated sheet glass including two sheets of glass and an interposed sheet of non-brittle material assembled to form a sandwich, means for effecting a preliminary pressing of the sandwich embodying a plurality of pairs of rolls between which the sandwich is adapted to be passed, the rolls of the first pair being of greatest diameter at their centers and gradually tapering toward their opposite ends, the rolls of the second pair being substantially cylindrical, and the rolls of the third pair being of smallest diameter at their centers and gradually increasing toward their opposite ends.

9. In apparatus for use in the production of laminated sheet glass including two sheets of glass and an interposed sheet of non-brittle material assembled to form a sandwich, means for effecting a preliminary pressing of the sandwich embodying a plurality of pairs of rolls between which the sandwich is adapted to be passed, the rolls of the first pair being of greatest diameter at their centers and gradually tapering toward their opposite ends, the rolls of the second pair being substantially cylindrical, and the rolls of the third pair being of smallest diameter at their centers and gradually increasing toward their opposite ends, and an additional pair of rolls mounted at substantially right angles with respect to the first mentioned pairs of rolls and also being of smallest diameter at their centers and gradually increasing toward their opposite ends.

10. In apparatus for use in the production of laminated sheet glass including two sheets of glass and an interposed sheet of non-brittle material assembled to form a sandwich, means for effecting a preliminary pressing of the sandwich embodying a plurality of pairs of rolls between which the sandwich is adapted to be passed, the rolls of the first pair being of greatest diameter at their centers and gradually tapering toward their opposite ends, the rolls of the second pair being substantially cylindrical, and the rolls of the third pair being of smallest diameter at their centers and gradually increasing toward their opposite ends, an additional pair of rolls mounted at substantially right angles with respect to the first mentioned pairs of rolls and also being of smallest diameter at their centers and gradually increasing toward their opposite ends, and means for receiving the sandwich from the first mentioned rolls, changing its direction of travel, and feeding it at substantially right angles between said last mentioned pair of rolls.

11. In apparatus for use in the production of laminated sheet glass including two sheets of glass and an interposed sheet of non-brittle material assembled to form a sandwich, means for effecting a preliminary pressing of the sandwich embodying a plurality of pairs of rolls between which the sandwich is adapted to be passed, the rolls of the first pair being of greatest diameter at their centers and gradually tapering toward their opposite ends, the rolls of the second pair being substantially cylindrical, and the rolls of the third pair being of smallest diameter at their centers and gradually increasing toward their opposite ends, an additional pair of rolls mounted at substantially right angles with respect to the first mentioned pairs of rolls and also being of smallest diameter at their centers and gradually increasing toward their opposite ends, and means for receiving the sandwich from the first mentioned rolls, changing its direction of travel and feeding it at substantially right angles between said last mentioned pair of rolls, said transferring means including a plurality of spaced parallel conveyor rolls adapted to receive the sandwich from the first mentioned pressing rolls, endless belts positioned between adjacent conveyor rolls and running parallel therewith, and means for raising and lowering the upper flights of said belts to a level either above or beneath that of said conveyor rolls.

FRANK FRASER.